June 9, 1936.  C. H. BISSELL ET AL  2,043,648
JUNCTION BOX
Original Filed Dec. 15, 1930   3 Sheets-Sheet 1

INVENTORS.
Carl H. Bissell
BY Raymond H. Olley
Bodell & Thompson
ATTORNEYS.

June 9, 1936. C. H. BISSELL ET AL 2,043,648
JUNCTION BOX
Original Filed Dec. 15, 1930  3 Sheets-Sheet 2
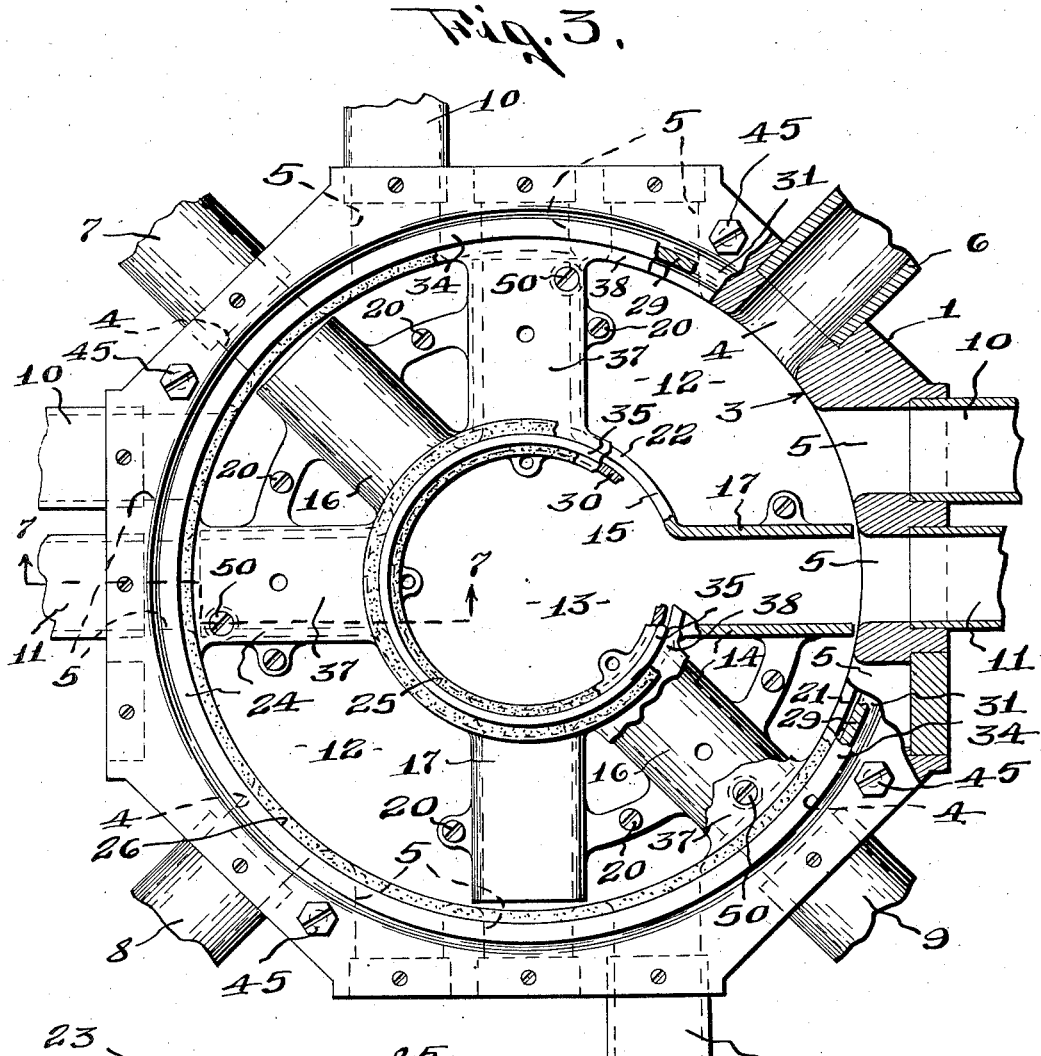
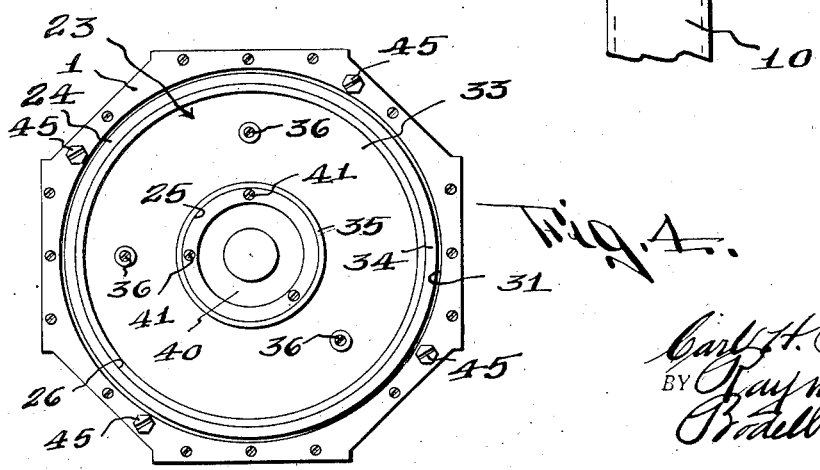
INVENTORS.
Carl H. Bissell
BY Raymond H. Olley
Bidell Thompson
ATTORNEYS.

June 9, 1936.  C. H. BISSELL ET AL  2,043,648
JUNCTION BOX
Original Filed Dec. 15, 1930   3 Sheets-Sheet 3
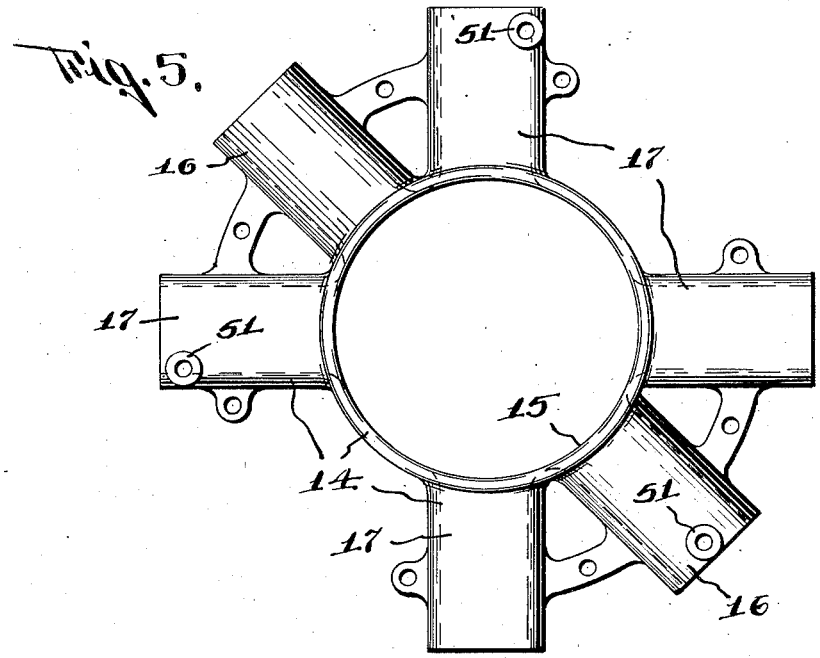
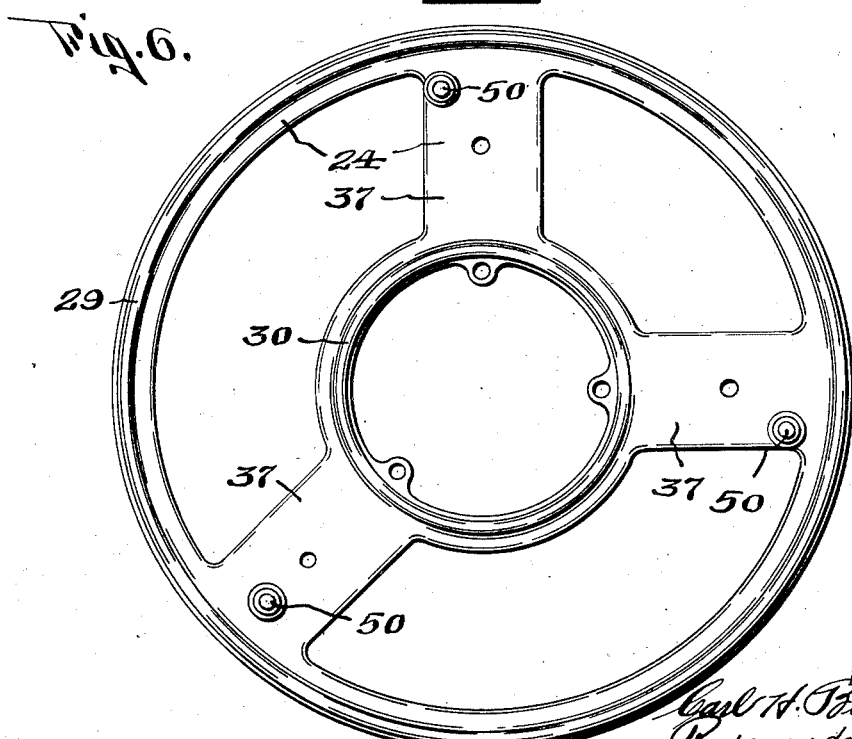

Patented June 9, 1936

2,043,648

UNITED STATES PATENT OFFICE 2,043,648

JUNCTION BOX

Carl H. Bissell and Raymond H. Olley, Syracuse, N. Y., assignors to Crouse-Hinds Company, Syracuse, N. Y., a corporation of New York Application December 15, 1930, Serial No. 502,356
Renewed April 16, 1935

15 Claims. (Cl. 247—15)

This invention relates to electric conduit systems, such as are embedded in the cement floors and walls of modern fire proof buildings, and has for its object, a particularly simple junction and outlet box embodying a detachable adjustable insert for providing inner and outer compartments within the box, or the body thereof with such compartments arranged in the same plane so that the box is of minimum thickness, and at the same time of great capacity and adjustability.

It also has for its object, a particularly simple and efficient means for providing a box body with the inner and outer compartments in the same plane, and a single cover having means whereby the compartments are readily accessible individually or simultaneously.

It further has for its object, a particularly simple means for adjusting and leveling the box against a back wall so that it occupies the proper position after the cement is poured to form the wall in which the box is embedded, and also means for securing and adjusting and leveling the cover so that it is flush, or in any other desired relation to the outer surface of the wall or floor in which the box is embedded.

The invention consists in the novel features and in the combinations and constructions hereinafter set forth and claimed.

In describing this invention, reference is had to the accompanying drawings, in which like characters designate corresponding parts in all the views.

Figure 3 is a plan view of the box, partly in section, the cover being removed.

Figure 4 is a plan view on a reduced scale of the entire box including the cover.

Figure 5 is a plan view of the insert.

Figure 6 is an inverted face view of the cover frame or support.

Figure 1:
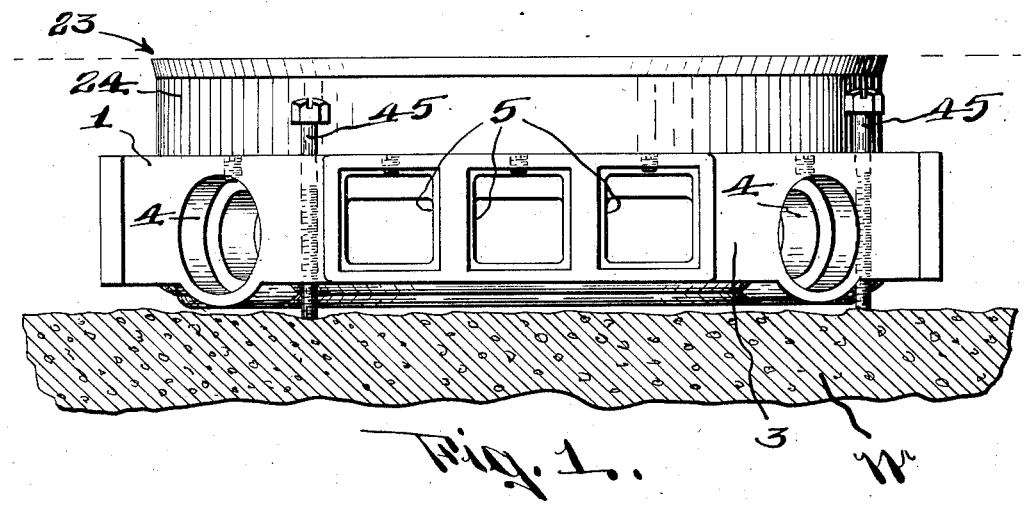
Figure 1 is an elevation of this junction box, the contiguous portion of a supporting wall against which the box is preliminarily set before the concrete is poured, being also shown.
Figure 2:
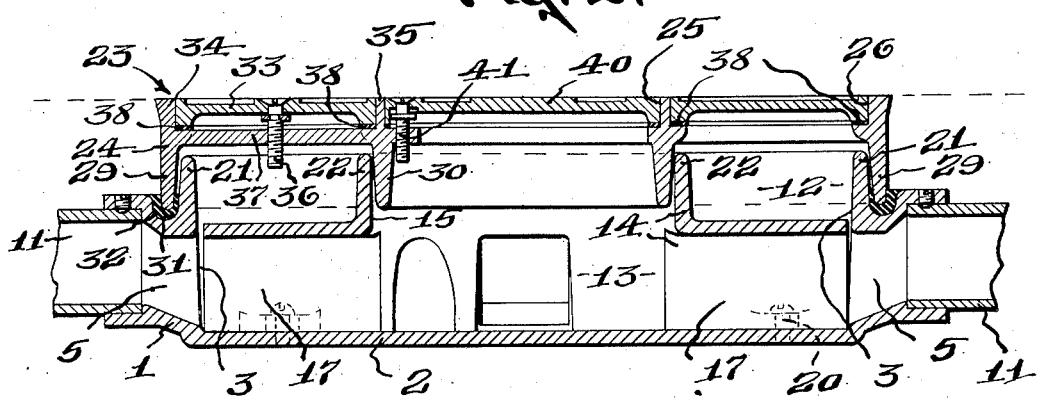
Figure 2 is a transverse, vertical, section view of parts seen in Figure 1.
Figure 7:
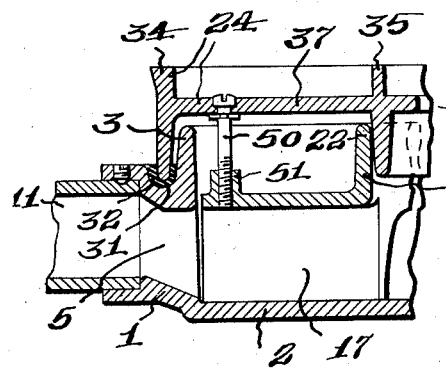
Figure 7 is a sectional view on line 7—7, Figure 3.

This junction box comprises generally, a body having bottom and side walls, and an open top, the side walls having conduit receiving openings, and means insertable in the body and detachably secured therein for providing an inner or central compartment, and conduits between the central compartment and some of the conduit receiving openings, the space around the central compartment and the conduit connection forming an outer compartment, and a cover for the open side of the box preferably having different cover pieces for the compartments.

This junction box forms part of a conduit system for wires, as telephone wires and electric light wires. For instance, the outer compartment of the box may be used for telephone wires, and inter-communication wires, while the inner compartment is used for electric light wires. As the telephone company requires that their wires be separate from other wires, either one or the other of the compartments is used exclusively for telephone wires.

1 designates the body of the box having a bottom wall 2, and side walls 3, the body being open at its top. The body is preferably formed with its outer wall octagonal, and its inner wall circular, and the side walls are provided with sets of wire receiving passages 4 and 5 opening through the octagonal faces. Some of these passages are round for receiving round conduits which enclose feed wires, and others are square for receiving square conduits which conduct branch wires. There are usually four round conduits and passages located with their axes at a right angle to each other, and each face of the box in which a round conduit is mounted is provided with but one round opening, while each of the other octagonal faces in which the square conduits are mounted is provided with a plurality, usually three square openings.

The conduits 6, 7, 8 and 9 designate the round conduits enclosing the feed wires.

10 and 11 designate the square conduits enclosing branch wires. All of these conduits 6, 7, 8, 9, 10 and 11 are suitably secured in the passages 4 or 5, in any suitable manner as by set screws, and may be further sealed in position if desired, in any well known manner. The conduits 10 open into the outer compartment 12 of the box, and the conduits 11 communicate through hollow arms, to be described, with the inner compartment 13.

The means for providing the inner and outer compartments in the body 1 is here shown as a skeleton or spider structure 14 comprising a central circular wall 15, and conduits 16 and 17 radiating from the circular wall 15, the conduits 16 being substantially arcuate to mate with the round openings 4, and the conduits 17 being angular to mate with the square openings 5. The space or chamber 13 encircled by the circular wall 15 is open at its top and bottom, and also the conduits 16 and 17 are open at their bottoms, and the bottom of the body 1 forms the bottom wall of the inner compartment 13 confined by the circular wall 15, and the bottom of each of the conduits 16, 17.

The insert 14 is held in position in any suitable manner, as by screws 20 threading into the bottom of the box. The insert 14, which is in the general form of a spider, can be adjusted by shifting it about its axis to different angular positions to bring the conduits 16 into registration with different conduits 6, 7, 8 or 9, and the conduits 17 into registration with different conduits 10, 11. When any of the passages 4, 5 are not used, they may be plugged up in any suitable manner by plugs substituted for the conduits 6 and 10.

The body 1 is formed with an upwardly extending circular flange 21 at the open side of the body, and the circular wall 15 extends above the tops of the conduits 16, 17 forming a flange 22. 23 designates generally, the cover, this including a cover frame 24 having inner and outer openings 25 and 26 for alinement with the inner compartment 13 enclosed by the wall 15 and the outer annular compartment 12 in the box between the wall 15 and the outer wall of the box, through which compartment 12 the conduits 16 and 17 extend, and the cover frame is formed with downwardly extending annular flanges 29 and 30 lapping respectively the flanges 21 and 22, the flange 29 extending outside of the flange 21, and the flange 30 inside the flange 22. The lower edge of the flange 29 enters a suitable seat or groove 31 around the base of the flange 21, and is sealed therein by any suitable compound at 32.

33 designates an annular cover piece for the outer compartment 12, this lying between outer and inner concentric flanges 34, 35 provided on the outer side of the cover support 24. It is secured in position in any suitable manner, as by screws 36, which thread into spider arms 37 connecting the flanges 29 and 30 of the cover support. The screws 36 are held from endwise movement relatively to the cover piece 33, and thread into the arms 37. Thus, the height of the cover piece can be adjusted to come flush with the edges of the flanges 34, 35. Suitable gaskets are interposed between the cover piece 33 and annular seats 38.

40 designates the cover piece for the central compartment 13, this being secured to the cover frame by screws 41, similar to the screws 36.

One feature of the invention, is means for leveling the box relatively to the back surface against which it rests, prior to the pouring of the cement or concrete to form a wall in which the box is to be embedded, and also means for the leveling and adjusting of the cover carrier 24. The means for leveling the box comprises a plurality of screws 45 spaced apart around the box and thrusting against the wall W. Obviously, by adjusting the screws, the box can be leveled, and located relatively to the back wall so as to conform to the depth of the wall to be formed. The cover frame 24 is adjusted so as its face will be flush, or in any other predetermined relation with the outer face of the wall, by screws 50 similar to the screws 36, these screws 50 extending through the spider arms 37 of the cover frame 24 and threading into bosses 51 on some of the conduits 17 of the insert.

In operation, the body of the box is located on the wall W before the final layer of concrete is poured, the conduits being properly connected to the box in conformity to a prearranged plan. The insert 14 is then secured in the box in accordance with the plan, and the cover placed in position and adjusted. One class of wires, as for instance, light wires, may pass through the main conduits 6, 8 into the compartment 12, and then out through any branch conduits 10, opening into the outer compartment 12. Another class of wires, as for instance, telephone wires pass through the round conduits 7 and 9, and the hollow arms 16 into the center compartment 13 and thence, out through branch spider arms and other square branch conduits 11 alined therewith. Thus, lighting company workmen can get access to the lighting wires without disturbing the telephone wires and vice-versa, and each class of wires is in their own compartment, and conduits, and one class of wires can not be confused with another. Also, the insert is adjustable in the body of the box to suit any conditions that may arise, or is adjustable in accordance with any prearranged plan of wiring.

What we claim is:

1. A junction box comprising a body having bottom and side walls, and an open top, the side walls having conduit receiving passages therethrough, and a skeleton insert in the box comprising a central compartment having hollow arms radiating therefrom for alinement with certain of the conduit receiving passages, and being adjustable to aline with other of said passages and a cover for the open top of the box, and a cover for the central compartment, the cover for the box being detachable without disturbing the cover of the inner compartment.

2. A junction box comprising a body having bottom and side walls and an open top, the side walls being formed with conduit receiving openings and displaceable means in the box for providing a central compartment and having hollow arms extending from the central compartment through the body for communication with some of the conduit receiving passages and being shiftable about its axis for communication with other of said passages, the space around the central compartment and said arms forming an outer compartment in the box, a cover for the outer compartment, and a cover for the inner compartment, said cover for the outer compartment being separably detachable relative to said cover for the inner compartment.

3. A junction box comprising a body having bottom and side walls, and an open top, the side walls being formed with conduit receiving openings and displaceable means in the box for providing a central compartment and hollow arms extending from the central compartment through the box for communicating with some of the conduit receiving passages, the space around the central compartment and said arms forming an outer compartment in the box, the central compartment being open at its top and bottom, and said arms being open at their bottoms, the bottom of the body forming the bottoms of the central compartment, and of said hollow arms, and a cover for the body.

4. A junction box comprising a body formed with bottom and side walls, and an open top, the side walls being provided with conduit receiving openings, and a skeleton insert in the body in the form of a spider comprising a central compartment, and hollow arms radiating therefrom and communicating with some of said passages, means for detachably securing the insert in the body, the space in the body around the central compartment and the hollow arms forming an outer compartment in the body, the inner compartment being open at its top and bottom and the hollow arms being open at their bottoms, the bottom of the body forming the bottoms of the central compartment and of the hollow arms.

5. A junction box comprising a body having inner and outer concentric compartments for connection to conduit means, the body being open at its upper side, and having an upwardly extending flange around its open side, the central compartment being open at its top and having an upwardly extending flange around its upper end, a cover comprising a skeleton support having outer and inner flanges lapping respectively the former flanges, and detachable inner and outer concentric cover pieces detachably connected to said support to cover the outer and inner compartments respectively.

6. A junction box comprising a body having a bottom and side walls and an open top, the side walls being provided with conduit receiving passages, means located in the body for providing a central compartment and an outer compartment in the body around the central compartment, said means being shiftable about its axis and having hollow arms extending from the central compartment to one of the conduit receiving passages in the outer wall of the body, a cover support carried by said means and covers for the respective compartments carried by said support, each of said covers being removable without reference to the other cover.

7. A junction box comprising a body having bottom and side walls and an open top, a detachable member located within the body for providing a central and an outer chamber, said member having a plurality of hollow arms extending radially from the central compartment, said member being shiftable about its axis relative to the body whereby said hollow arms may communicate with various of the conduit receiving passages, the depth of the outer compartment being greater than the diameter of the said hollow arms, cover supporting means carried by said member and covers for the respective compartments carried by said cover supporting means, each of said covers being detachably secured to said supporting means whereby access may be had to the outer compartment without removing the cover of the inner compartment.

8. A junction box comprising a body having bottom and side walls and an open top, the side walls being provided with conduit receiving passages, a member located within the box for providing inner and outer compartments within the box, said member having hollow arms extending radially from the inner compartment, the member being shiftable about its axis and communicating with some of said conduit receiving passages, a cover supporting member carried by said shiftable member and being adjustable toward and from said shiftable member and being provided with means for extending the walls of the inner and outer compartments when said cover supporting member is adjusted relative to the shiftable member and covers for the respective compartments carried by the cover supporting member.

9. In a junction box having bottom and side walls and an open top, the side walls being provided with passages for receiving feed circuit conduits and other passages for receiving branch circuit conduits, a member located within the box for providing inner and outer compartments and having a set of hollow arms extending radially from the central compartment for communicating with the passages for receiving the branch circuit conduits and a second set of hollow arms extending radially and in communication with some of the passages for receiving the feed circuit conduits, said member being shiftable about its axis for shifting the second set of arms into communication with other of said passages for receiving feed circuit conduits and a detachable cover for each compartment.

10. A junction box comprising a body having a bottom and side walls, and an open top, the side walls having conduit receiving passages extending therethrough and displaceable means in the box for providing a central compartment and having hollow arms extending from the central compartment towards the outer sides of the box for communicating with some of the conduit receiving passages, the outer ends of said hollow arms terminating adjacent the inner face of the sides of the box, and said means and hollow arms being shiftable as a unit to bring said hollow arms in communication with others of said conduit receiving passages, and a top for the open top of the box.

11. A junction box comprising a body having a bottom and side walls, and an open top, the side walls being formed with conduit receiving passages, a removable spider member detachably secured in the box and including an annular portion for providing a central compartment and hollow arms extending from the annular portion towards the outer side walls of the box and communicating with some of the conduit receiving passages, the outer ends of said hollow arms terminating adjacent the inner surface of the side walls of the box, said spider member being removable as a unit from the box, and a cover for the open top of the box.

12. A junction box having a bottom and side walls, and an open top, the side walls being provided with conduit receiving passages extending therethrough, a spider member detachably secured within the box for providing inner and outer compartments in the box and having a set of hollow arms extending radially from the central compartment for communicating with certain of the conduit receiving passages, a cover support carried by said hollow arms, a cover for the central compartment detachably secured to said cover support, and a second cover for the outer compartment detachably secured to said support.

13. A junction box having a bottom, side walls, and an open top, the side walls being provided with conduit receiving passages, a spider member detachably secured within the box for providing inner and outer compartments and having a set of hollow arms extending radially from the central compartment for communicating with certain of the conduit receiving passages, a cover support, covers for the inner and outer compartments carried by the cover support, the spider member being adjustable within the box about its axis without removing said cover support from the body.

14. In a junction box having a bottom, side walls, and an open top, the side walls being provided with conduit receiving passages, a spider member detachably secured within the box for providing inner and outer compartments within the box and having a set of integral hollow arms extending radially from the central compartment and terminating adjacent the inner surface of the side walls of the box, and communicating with certain of the conduit receiving passages, said spider member being shiftable about its axis relative to the box without removing said member from the box.

15. A junction box comprising a body having a bottom, side walls, and an open top, said box being provided with an inner and outer compartment, hollow arms extending from the central compartment to the outer side walls and communicating with certain of said conduit receiving passages, said hollow arms being detachably secured in the box, means for detachably supporting covers over the inner and outer compartments respectively, each of said covers being separably removable from the box without disturbing the other cover.

CARL H. BISSELL.
RAYMOND H. OLLEY.